Patented Dec. 10, 1935

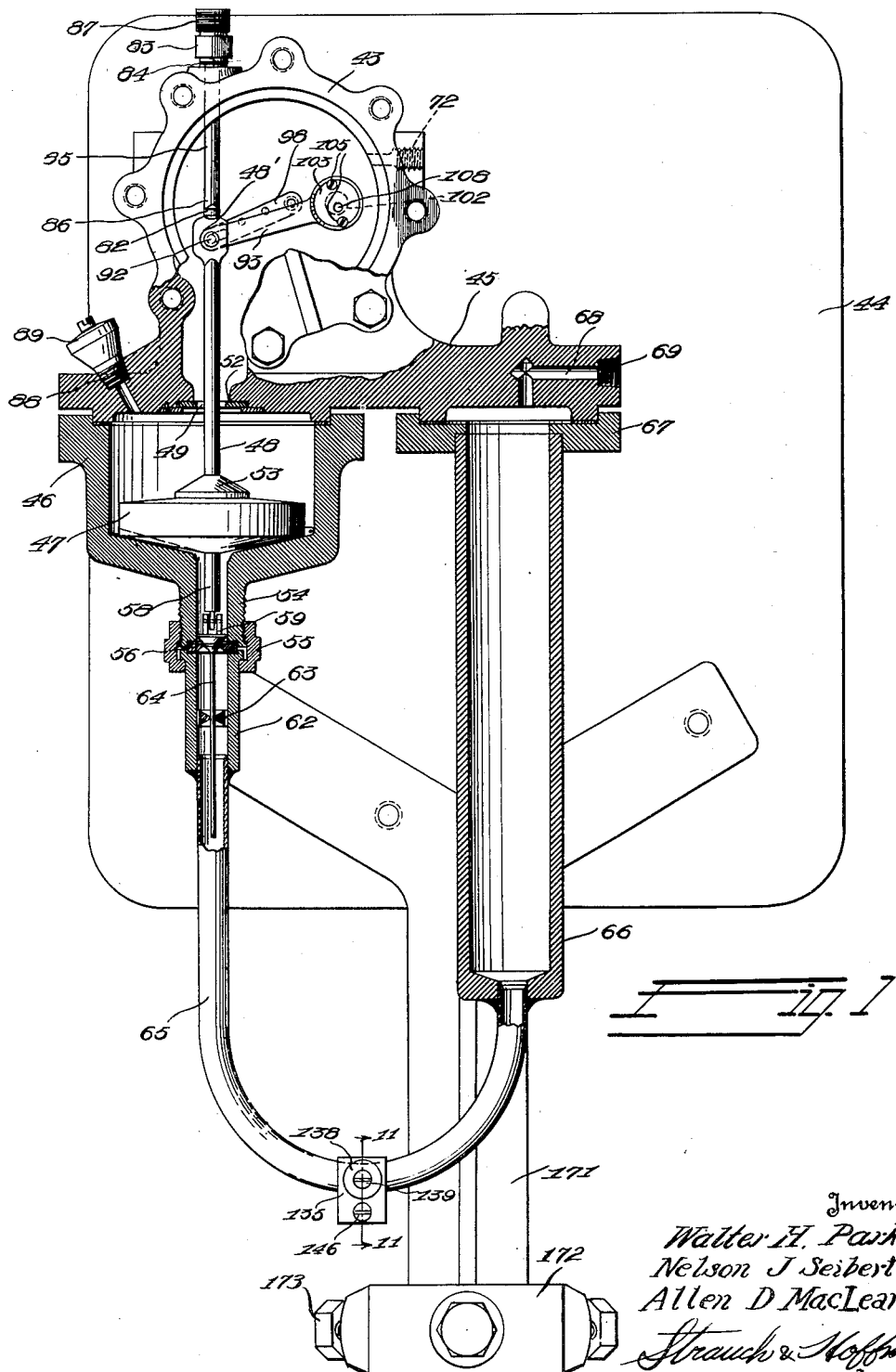

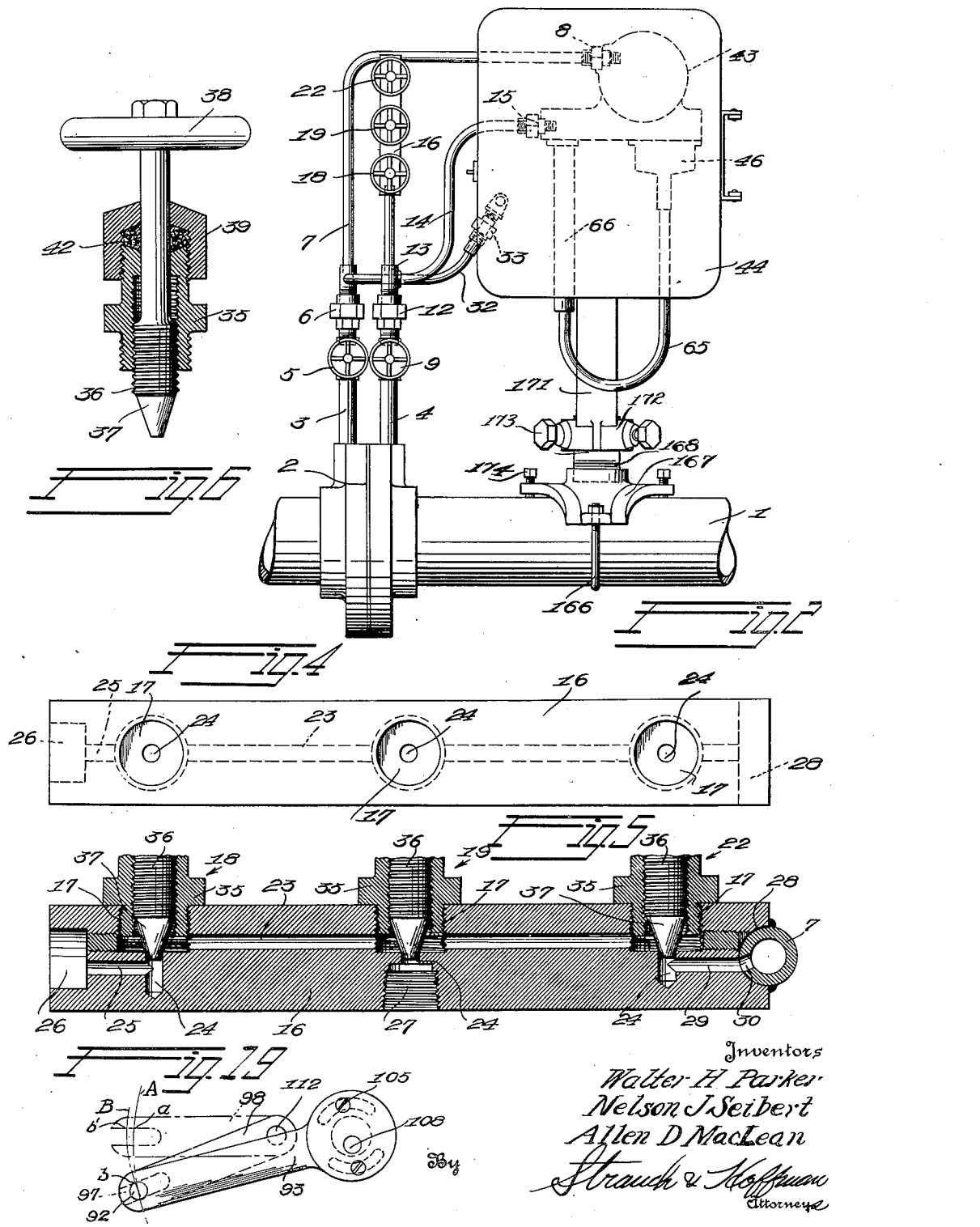

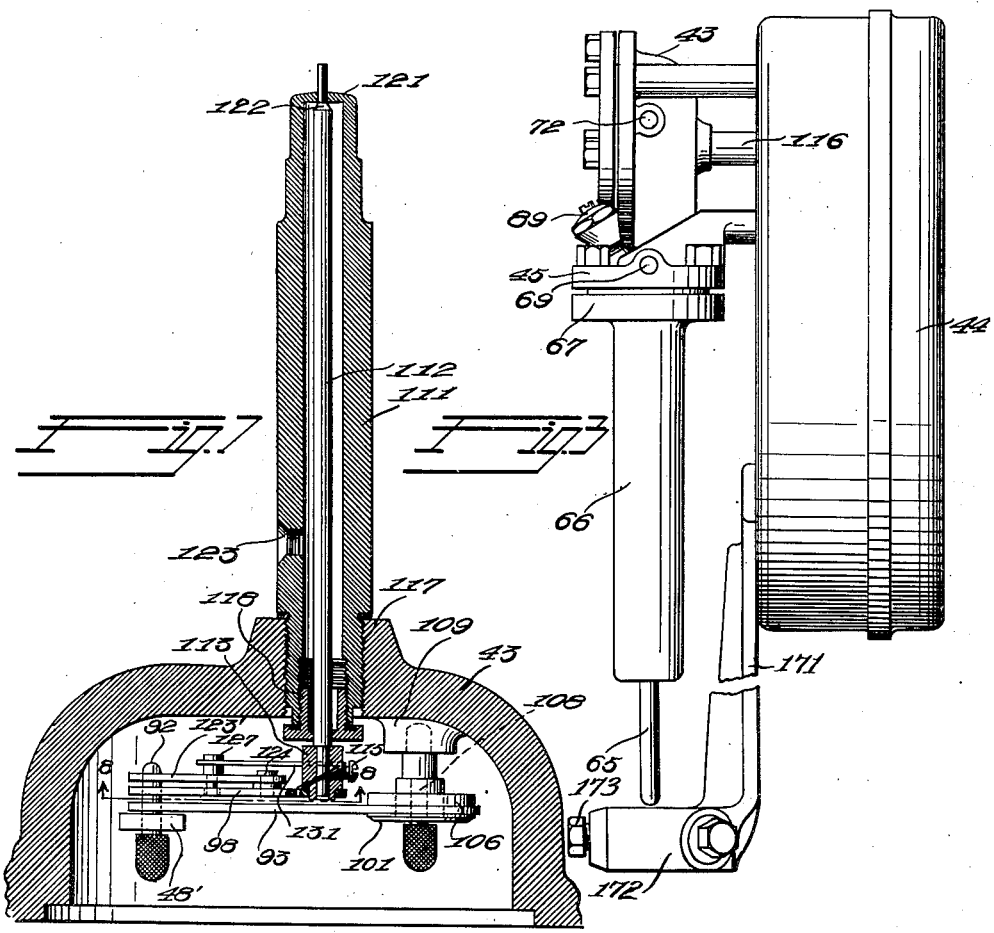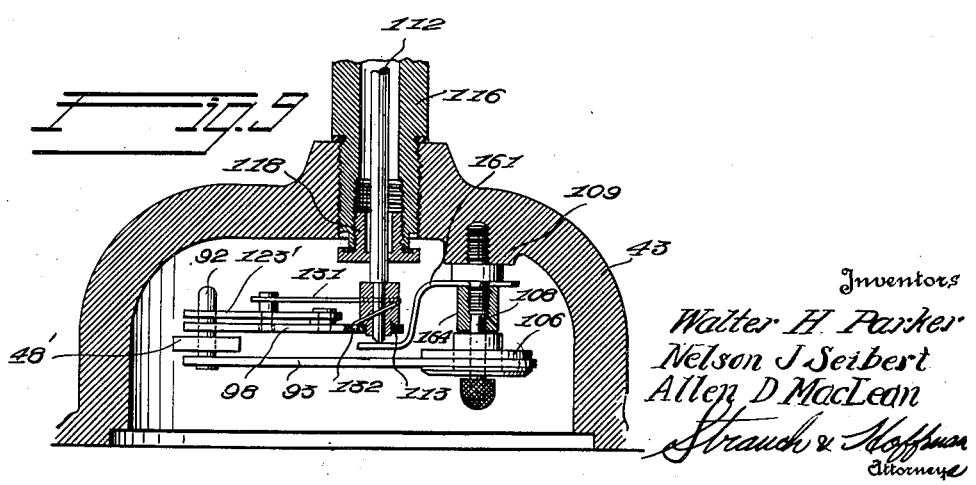

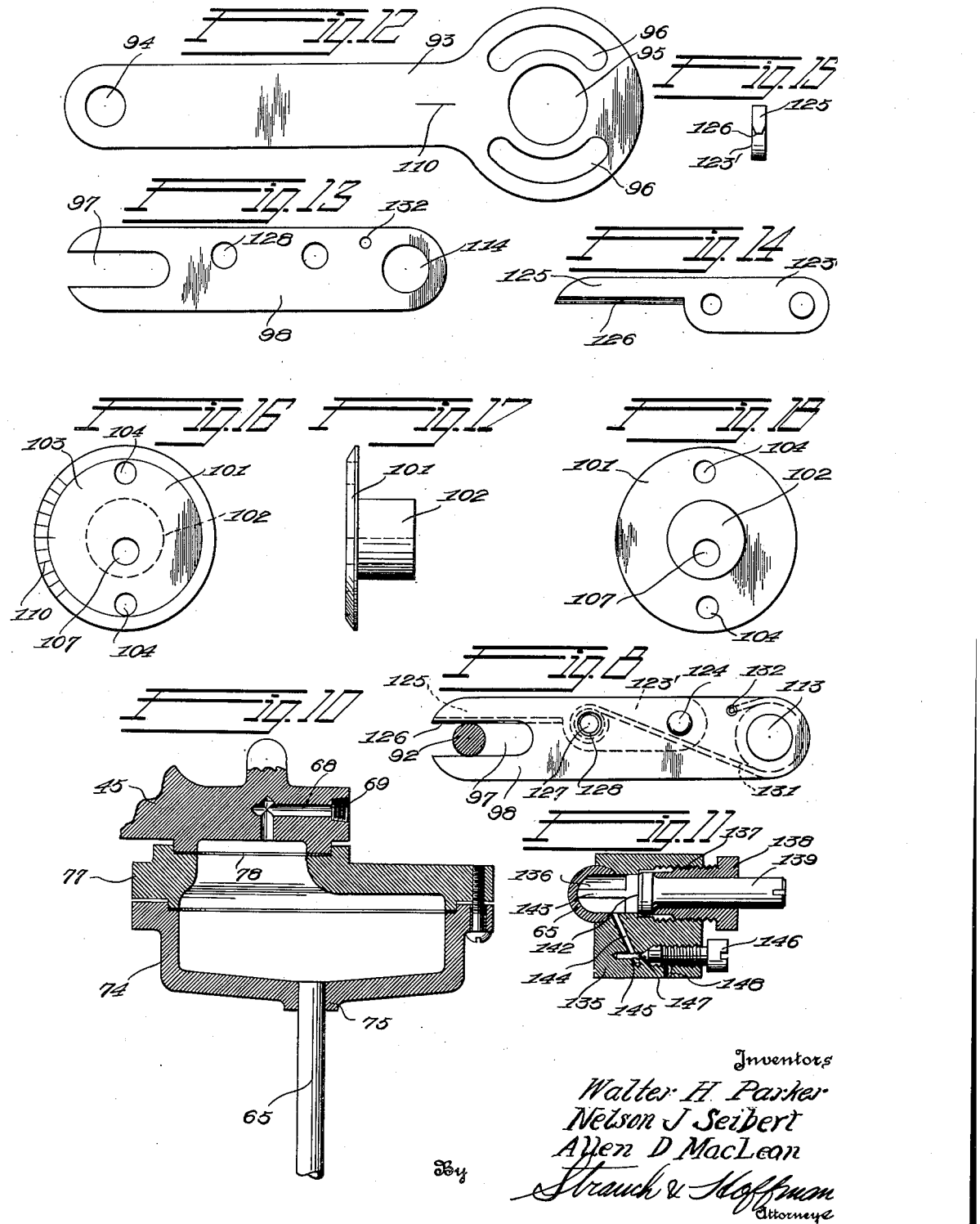

2,024,059

UNITED STATES PATENT OFFICE 2,024,059

ORIFICE METER

Walter H. Parker, Pittsburgh, and Nelson J. Seibert and Allen D. MacLean, Wilkinsburg, Pa., assignors to Pittsburgh Equitable Meter Company, Pittsburgh, Pa., a corporation of Pennsylvania Application March 4, 1930, Serial No. 433,110

17 Claims. (Cl. 73—167)

This invention relates to new and useful improvements in orifice meters used for measuring the flow of gases or liquids.

In the usual type of orifice meter there is a restriction in a conduit through which the fluid passes, with pipes connected to the high and low pressure sides of said restriction, said pipes being connected to high and low pressure chambers of the meter, the chambers being joined by a U tube containing liquid. One of said chambers, usually the high pressure chamber, has a float therein, the movement of which indicates the differential pressure and therefore the flow of fluid. The float is usually connected to a pivoted pen arm or other indicator, whereby said arm is operated about its pivot in response to vertical movement of the float.

An object of this invention is the provision in an orifice meter of a mechanism for transmitting the movement of the float to an indicator which eliminates the use of a stuffing box and reduces friction.

Another object is the provision of an indicator operating shaft which is sealed by lubricant to prevent loss of pressure from the float chamber of the meter.

Another object of this invention is to provide an orifice meter having a damping valve and a draining vent adjacent thereto so that it can be cleaned with a minimum of labor.

A further object is the provision of means for preventing over or under ranging of the orifice meter upon sudden changes of pressure of the fluid being measured.

Another object of this invention is to provide an orifice meter so constructed that it may be readily disassembled for cleaning and may be readily reassembled after the cleaning operation to its original setting, so that recalibration is not required.

Another object of this invention is to provide a novel manifold structure integrally constructed and having all joints thereof securely fixed, as by welding, soldering or the like, and provided with a plurality of valves for testing and checking, thus eliminating the possibility of leakage caused by loosening of the joints during shipment and during installation and operation.

Another object of this invention is to provide an orifice meter having interchangeable chambers so that its differential range may be readily changed from 20 inches to 50 inches or 100 inches or to any other suitable range. The interchangeable parts whereby the above changeover may be accomplished are greatly simplified such that by the removal of four screws and one union nut the change from one capacity meter to the other may be made.

These and other objects will be apparent from the following description and the appended claims when taken in conjunction with the accompanying drawings wherein:

Figure 1 is a rear view of our orifice meter with parts thereof in section, and the pipes disconnected therefrom.

Figure 2 is a front elevation thereof on a smaller scale.

Figure 3 is a side elevation thereof.

Figure 4 is a top plan of the valves manifold for checking and testing.

Figure 5 is a longitudinal section thereof with one pipe connected thereto.

Figure 6 is a sectional view of one of the valves used with the manifold.

Figure 7 is an enlarged view from above partly in section showing the linkage connecting the float arm and the pen shaft.

Fifiure 8 is a detail sectional view taken on line 8—8 of Figure 7.

Figure 9 is a view similar to Fgiure 7 showing a modified form.

Figure 10 is a broken sectional view of the twenty inch chamber and the adapter for connecting it to the meter.

Figure 11 is an enlarged section on line 11—11 of Figure 1 showing the combined damping device and drain valve.

Figure 12 is a plan of the float arm link.

Figure 13 is a plan of the pen link.

Figure 14 is a plan of the pen link take-up arm.

Figure 15 is an end elevation thereof.

Figures 16, 17 and 18 are front, side and rear elevations, respectively, of the float arm link hub used for adjustments.

Figure 19 is a diagrammatic view showing the movement of the compensating links.

Referring to the drawings (Fig. 2) the conduit 1 is provided with a restriction 2 which may be a plate within said conduit or a Venturi tube, the pipe 3 being connected to the low pressure side of the restriction, and pipe 4 being connected to the high pressure side thereof. The low pressure pipe 3 passes by means of valve 5 and union coupling 6 into communication with an upwardly extending conduit 7 of a unitary manifold structure which has on one end thereof a union coupling 8 for threaded engagement with the low pressure chamber of the meter.

The high pressure pipe 4 is connected to valve 9 and union coupling 12 into communication with bypass pipe 13 of the manifold having a branch 14 for connection with the high pressure chamber of the meter by means of a screw-threaded coupling 15.

A novel device is interposed between the pipes 7 and 13 in order to zero, check, and test the orifice meter under service conditions. This device comprises a main body 16 which is securely fixed to the pipes 7 and 13, as by welding, brazing or soldering, to form therewith a unitary manifold construction. This manifold device is shown in detail in Figures 4 and 5. The main body 16 has three ports 17 therein for the reception of valves 18, 19, and 22. A cross channel 23 extends lengthwise of the manifold body 16, said channel communicating with the openings 17. Each opening 17 has a bore 24 communicating with the bottom thereof, the bore 17 at the lower end of manifold 16 in which is positioned valve 18 having a connecting channel 25 communicating therewith and connected to a chamber 26.

The pipe 13 is secured in chamber 26 as by welding, the pipe 13 thus communicating with channel 25. The bore 24 for the central opening 17 communicates with a screw threaded socket 27 adapted to receive a pressure gauge. The opening 17 at the upper end of the manifold is in communication with a semi-cylindrical channel 28, by means of a bore 29 communicating with the bore 24 in the bottom of the upper chamber 17. The semi-cylindrical channel 28 is adapted to receive pipe 7 and is securely fixed thereto as by welding. Pipe 7 has a channel 30 therein to thus place pipe 7 in communication with bore 29, upper bore 24, and opening 17.

The needle valves 18, 19 and 22 control passage of fluid from bores 24 into the respective openings 17, to thus control passage of fluid through longitudinal channel 23. By closing the needle valves 18 and 22 communication between pipes 7 and 13 through the main body 16 is cut off since valve 18 closes the channel 25, and valve 22 closes the channel 29 at the upper end of the manifold.

In order to zero the orifice meter, or to put equal pressure in both the high and low pressure chambers thereof, the center valve 19 is closed and the end valves 18 and 22 are opened. Thus communication is established between the high pressure pipe 13 and the low pressure pipe 7 by means of the lower opening 26 in the manifold, the bore 25, bore 24 of the lower valve 18, channel 23, upper bore 24, and channel 29 to opening 30 into pipe 7. The communication thus established will cause a balance of pressure in both the high and low pressure chambers of the meter since the pressure is by-passed around the orifice meter and the level of liquid in the two pressure chambers will be the same so that the instrument will indicate zero differential pressure and can be so calibrated.

The orifice meter can be checked by closing either one of valves 18 or 22 so that the orifice meter records the gauge pressure in the line. By connecting an accurate pressure gauge at opening 27 the gauge likewise will register the gauge pressure in the line, and the readings of the orifice meter pen and gauge can be compared to check the accuracy of the orifice meter. To test the low static pressure in the conduit, the lower valve 18 is closed and the center valve 19 and the upper valve 22 are opened. If desired the high static pressure may also be tested on the pressure gauge by opening lower valve 18 and center valve 19, and closing upper valve 22.

It will be clear that the manifold construction as above described is so made that with the needle valves associated therewith pressure can be shunted across the manifold or pressure from either side can be read from a pressure gauge connected therewith. The valves 5 and 9 in the low and high pressure pipes 3 and 4 are provided so that pressure from either or both sides may be shut off. The manifold body construction as above described, welded or otherwise fixedly secured to pipes 7 and 13 makes a compact and rigid construction. By making the manifold body 16 in one piece all joints and possibility of leakage are eliminated. The manifold will stand up under rough treatment and can be twisted and sprung into place between the conduits when necessary without any tendency to loosen any threaded pipe joints, as would be the case if threaded joints were used.

It will be understood that this invention is associated with an orifice meter embodying a chart whereon is recorded the differential pressure as indicated by the position of the float and the static low pressure. In order to impress the static low pressure on the static indicating means associated with the orifice meter, the manifold construction includes a pipe 32 which is branched from pipe 7 and has a threaded coupling 33 thereon for engagement with the conduit of the meter leading to the static pressure gauge, not shown.

The needle valves, 18, 19 and 22 are duplicates and one only will be described. As seen in Fig. 6 each valve includes a threaded bushing 35 for reception in the threaded opening 17 of the manifold body, said bushings being interiorly threaded for the reception of the reciprocating valve member 36, having a conical valve 37 thereon, and provided with a handle 38. A packing nut 39 is threaded on boss 35 to compress the packing 42 into fluid tight engagement with the valve stem. By rotation of handle 38 it will be clear that the valve 37 may be seated on or moved away from the end of the bore 24 to close or open these passages.

Referring now to Figure 1 wherein is shown an enlarged view of the rear face of the orifice meter, parts thereof being shown in section, a main casting 43 is secured to the back of the meter casing 44 in which is contained the clock, the pressure element and pressure indicating pen, and the differential pressure indicating or pen arm.

Casting 43 has a lower flange 45 to which is secured the float chamber 46 containing the float 47 having secured thereto the float arm 48. Float arm 48 projects upwardly through a restricted opening 49 in the flange 45, there being secured to the lower face of flange 45 around said opening a suitable composition valve seat 52 for cooperative engagement by a convex valve member 53 on the upper end of float 47, whereby if the device is subjected to excessive pressure the float 47 will rise and the valve 53 thereon will engage on seat 52 to prevent loss of the liquid, such as mercury through the opening 49.

The float chamber 46 has a downwardly projecting nipple 54 to which is screw threaded a coupling member 55. A lower valve seat 56 is clamped against the nipple 54 by screw-threaded coupling 55 and serves to seal the connection, and float 47 has a depending stem 58 to which is secured a valve 59 for cooperation with seat 56. Valve 59 is loosely pivoted to stem 58 such that it may move freely in all directions to have a limited universal motion whereby it may accurately seat against valve seat 56. Thus it will be seen that excessive high pressure or excessive low pressure will not result in the loss of mercury since either valve 53 will close on seat 52 or valve 59 will close on seat 56 to prevent loss of mercury from the U tube associated with the orifice meter.

A depending pipe 62 is secured in liquid tight engagement to nipple 54 by coupling 55, said pipe 62 having a guide bushing 63 therein for guiding rod 64 secured to the lower part of valve 59, and thus secured to float 47. By the provision of bushing 63, and guide rod 64, the float 47 is so guided that its motion is vertical.

A U tube 65 is secured to the lower end of conduit 62 as by welding or otherwise and is secured at its other end to chamber 66, as by welding. As shown in full lines in Fig. 1 chamber 66 is flanged at 67 and is secured at its upper end to flange 45 of casting 43 by bolts not shown, which connect these two flanges. The flange 45 is bored as at 68, said bore 68 being provided at its end with a threaded portion 69 for connection with threaded nipple 15 leading from the high pressure side of the conduit. A threaded bore 72 is provided in casting 43 for the reception of threaded coupling 8, whereby low pressure from the conduit is put into communication with the main chamber of casting 43 and by way of opening 49 into the low pressure chamber 46.

In order that the orifice meter may be adapted for various ranges of pressure, the high pressure chamber is made interchangeable with other chambers which are adapted to fit upon the lower face of flange 45. The high pressure chamber 66 shown in Fig. 1 is a one hundred inch chamber, that is, it is adapted to accommodate sufficient mercury to provide one-hundred inches of pressure of water corresponding approximately to 3.61 pounds differential pressure. If it is desired to substitute a chamber of different capacity such as a fifty inch chamber, the bolts securing chamber 66 to flange 45 are removed and union 55 is unscrewed.

A shallower chamber adapted to fit against the flange 45 in a similar manner to chamber 66 is then substituted, the new chamber having a U tube 65 welded thereto. Thus, the changing over of our improved orifice meter to various ranges is greatly simplified, since it is merely necessary to remove four cap screws holding the chamber and unscrew one union, and then substitute the new range chamber.

If it is desired to use a 20 inch range chamber corresponding to a low differential pressure, a shallow chamber 74 such as shown in Fig. 10 has the U tube 65 welded to the nipple 75 of said chamber 74, chamber 74 being adapted to be secured to flange 45 by means of an adapter 77. Adapter 77 has an opening 78 therein for alignment with the opening in the flange 45 and has openings for the reception of bolts for clamping the same to the lower face of flange 45. The 20 inch chamber 74 is secured to the adapter 77 by bolts or other securing means.

By the above described interchangeability, a single orifice meter may be used to measure the flow of fluid through pipes wherein the differential pressure varies widely, since the low pressure chambers are readily interchangeable.

The float arm 48 projects upwardly into the main casting 43 and terminates in a conical end 82. In alignment with the float rod the casting 43 has a threaded opening in the upper wall thereof adapted to receive a plug 83, said plug having an extension 84 threaded for reception in the opening in casing 43, with a stop rod 85 projecting downwardly into casing 43 and terminating in a conical seat 86. Plug 84 has an extension 87 extending in the opposite direction which is also threaded for engagement in opening in the casting 43. When the orifice meter is being shipped the plug 83 is screwed into the opening as shown in Fig. 1 until the conical end 86 thereof engages with the end 82 of float rod 48 to thus hold the movable parts of the instrument in set position such that the mechanism can not be injured during shipment by relative movement of the parts thereof. When the orifice meter is to be installed the plug 83 is removed from the opening in casting 43, turned over, and screwed back into said opening by means of the threaded portion 87, to prevent loss of pressure from the chamber. Thus the single element 83 functions as a stop, and also as a plug to prevent loss of pressure. This is a feature of practical importance since neither the shipping stop nor the plug can be lost as one or the other is always used, and this unitary member is therefore always in place.

A funnel shaped opening 88 is provided in communication with the low pressure chamber 46, said opening being normally closed by a plug 89. When the plug 89 is removed mercury or other liquid may be poured into the orifice meter for charging the U tube and the high and low pressure chambers connected thereto.

In orifice meters of the type to which this invention relates the vertical movement of the float operates an indicating arm or pen arm to move an indicator over a scale in accordance with the vertical movement of the float. However, due to the fact that the leverage between the vertically moving float and the indicator arm changes for various vertical positions of said float, it has been usual practice to provide an indicating scale the divisions of which are made proportionately larger for extreme positions of the float, or a compensating rod of varying cross-section areas is used in chamber 66. We have provided a novel mechanism connecting the vertically moving float arm and the indicator arm whereby the movements of the indicator arms are in direct proportion to the movements of the float arm in all positions of the float.

A flattened portion 48' is provided on the float arm 48 adjacent the upper end thereof and a pin 92 passes through this flattened portion and is securely fastened in opening 94 of a link or float guide 93, said link being shown more fully in Fig. 13. At its opposite end said link has an enlarged opening 95 with two arcuate slots 96 concentric with opening 95. The pin 92 passes through the link 93 and also through a slot 97 in a link 98, see Figure 14.

The outer link 93 has mounted on its large end a dial 101 shown in detail in Figures 17, 18 and 19. Dial 101 has a concentric hub portion 102 adapted to fit snugly within the opening 95 of link 93. Hub 102 has an outstanding flange member 103, of approximately the same diameter as the enlarged end of link 93. The flange 103 has openings 104 therein for the reception of screws 105 which pass through the slots 96 of link 93 and are screw threaded into a clamping ring 106 on the back of lever 93. An eccentric journal 107 passes through hub 102 for the reception of a pivot pin 108 mounted in a lug 109 on the rear face of the casting 43.

The link 98 is secured to a pen operating shaft 112 by a collar 113 which is fixed in the opening 114 in the end of said link, as by brazing, welding, riveting or soldering, said collar being secured to the pen shaft 112 by a set screw 115. The pen shaft passes through a tubular housing 111 which extends through the back wall of the casting 43 and into the casing 44 in which the chart or dial and the pen are housed. The tubular housing 111 is screw threadedly engaged with casting 43 as at 117, the end of said tubular housing within the casting 43 being closed by a threaded cap 118 which makes a snug fit with the pen shaft 112 and the end of the tubular housing 111. The opposite end of the tubular housing is enclosed by a wall 121 having a central opening through which the central shaft 112 carrying the pen passes. The pen shaft 112 has a slightly tapered conical portion 122 which bears against the annular flange 121, and these engaging surfaces are ground and lapped in to provide a tight and smooth joint at this point. A screw 123 normally closes an opening in the tubular housing 116, through which lubricant may be introduced into said tubular housing. As the end of the pen shaft 112 projects into the pressure chamber in casing 43, there is no opportunity for the sealing grease in the tubular housing 111 to escape along the shaft against this pressure, and the spring 161 and pressure in casing 43 urge the conical end of the shaft 112 against the seat in wall 121 thus aiding in preventing escape of lubricant or pressure at this point. The lubricant therefore forms a seal around shaft 112. By the structure just described it will be seen that rotation of the pen link 98 will rotate pen shaft 112 due to the sleeve 113 secured to the two parts.

In order to take up any lost motion between the pin 92 carried by the float arm and the pen operating link 98, said link has pivotally secured thereto a take-up link 123', pivoted at 124 to link 98. The links 98 and 123' are shown assembled in Figure 8 and link 123' is shown in detail in Figures 15 and 16. Link 123' has a portion 125 extending outwardly and parallel to slot 97, said portion having been leveled to substantially a knife edge 126, to reduce friction. A pin 127 is secured to link 123' and passes through said link and into an opening 128 in link 98, said opening being slightly larger than the pin 127 which enters said opening, as seen in Figure 7. A spring 131 is secured at one end to pin 127 and is coiled around sleeve 113 which pivotally supports link 98, and has its other end secured in opening 132 in link 98.

It will be seen from Figure 8 that the spring 131 tends to move the take-up link 123' about its pivot 124 so that the knife edge 126 bears constantly against the pin 92 which is carried by the float arm. Since the opening 128 in link 98 is larger than the pin 127 the take-up link 123' has a limited motion with respect to link 98. By this construction lost motion between link 98 and the pin 92 is automatically taken up at all times, and any wear between these parts is also automatically compensated for by the link 123'. The resistance to the movement of the pen shaft 112 and the parts movable therewith including the pen is very small, and the spring 131 is strong enough to move these parts without bending. Therefore motion of the pin 92 is directly transmitted without lost motion to the pen shaft 112.

Since the outer link 93 pivots about the pin 108 and the hub 102 is eccentric to pin 108, it will be clear that by loosening the set screws 105, the dial 101 may be partially rotated to thus move the eccentric hub 102 about pin 108 as an axis. Such movement of hub 102 functions to either decrease or increase the effective length of the link 93. This shortening or lengthening of link 93 is for the purpose of calibrating the instrument or to increase or decrease the pen travel with a given float travel. Shortening of the link 93 moves the float pin 92 closer to the pen shaft 112, about which the pen operating link 98 moves as an axis. This movement causes a greater arc of rotation of the pen shaft 112 for a given travel of the float 47. If the link 93 is lengthened, a decreased arc of travel of pen shaft 112 is provided for the same float travel. Thus accurate calibration may be made or the movements of the pen may be lengthened or shortened by simply loosening screws 105 and rotating dial 101. Indicating marks 110 are provided on dial 101 and link 93 to aid in calibration.

The linkage as above described compensates for inaccuracies of movement between the float and the pen arm as follows. Referring to Figure 19 since the pin 92 and the pivot 108 are a fixed distance apart, as the float rises from the position shown in full lines, the pin 92 moves slightly to the left thereof, thus sliding in the slot 97 in the pen link 98. Vertical movement of the pin 92, of course causes rotation of the pen link 98 to carry therewith the pen shaft 112. Since link 98 is proportionately shorter than link 93, during this movement the pin 92 slides slightly in and out and to and from the pen shaft 112, thus changing the radius of action of the pin 92 about the shaft 112 as an axis.

The pin 92 takes the path A shown in Figure 19 and said pin contacts with lever 98 at point $b$ when the float is down and the parts are in the position shown in full lines. When the pin rises to the dotted line position it moves in path A whereas point $b$ moves in path B about shaft 112 as a center. When the parts reach the dotted line position pin 92 contacts with lever 98 at point $a$, whereas point $b$, has moved to $b'$. Therefore the effective leverage on link 98 changes as the float rises and falls.

By mathematical formula the proper length of the links and distances between centers can be calculated to cause a rotation of pen shaft 112 in substantially equal arc units for equal vertical movements of the float.

In some installations of orifice meters it has been found that there is a pulsating or fluttering in the pressures to such extent that the indicator hand or pen flutters. In order to overcome this difficulty, we have provided an improved dampening device to resist the flow of mercury in the U tube so that minor pulsations of pressure are not transmitted to the pen shaft. This device is shown in Figure 1 and in detail in Figure 11.

The tube 65 is slotted adjacent the lowest portion thereof and a combined dampening device and drain valve is secured over the body portion of said tube, preferably by welding, or soldering. The device comprises a casing 135 with a passage 136 which communicates with the slot in the tube 65. The passage 136 is screw threaded at its opposite end as at 137 and is adapted to receive a clamping collar 138. Collar 138 is centrally apertured to receive the projecting end 139 of the valve 142, which valve includes the solid partition 143 which may be turned to various positions to provide an adjustable restriction in the passage 136 and pipe 65. The collar 138 bears at its inner end against valve 142 to hold said valve in set position and to retain packing around the valve stem to prevent leakage of the liquid. As shown in Figure 11, the portion 143 of the valve 142 is completely open to provide the minimum restriction or dampening effect in the tube. By loosening the threaded collar 138, the valve 142 may be rotated to turn the partition 143 thereof into more or less restricted positions as regards passage 136. Thus a variable restriction is provided in the tube connecting the high and low pressure chambers such that slight fluctuations in pressure are not transmitted to the indicating means such as the pen arm.

In order that the liquid contained within the tube may be conveniently drained so that the meter may be shipped, the body 135 is provided with a passage 144 leading downwardly from passage 136 and communicating with a cross-channel 145. The body 135 is bored and threaded to receive a plug 146 having a conical end 147 for cooperating with a conical seat in the cross-passage 145. A drain opening 148 communicates with the cross-channel 145. If the needle valve 146 is rotated the conical end 147 thereof leaves the seat provided in the end of the cross-channel 145 and the liquid contained in the tube may drain through the passage 144, cross-channel 145, and out of the vent 148.

By the above described construction a simple unitary dampening device and drain valve is provided for use in orifice meters which is securely fixed to the U tube to prevent the possibility of leakage.

A slight modification of the arrangement of the linkage is shown in Figure 9. Ordinarily the links will be so positioned that there will be no leakage between the conical end 122 of the pen shaft 112 and the inwardly projecting flange 121 of the stuffing box 116. However, in order to prevent any possible leakage at this point, a spring 161 is shown in Figure 9 which is clamped on the pin 108 by a collar 164 and has its end in engagement with the projecting end of the pen shaft 112. This spring 161 maintains the conical portion 122 of the cam shaft 112 into close engagement with its ground seat 121 so that there can be no leakage of lubricant at this point. In order to accommodate the spring 161 the link 93 is moved outwardly beyond the float arm 48.

In order to provide a simple and readily adjustable mounting for the orifice meter the casing 44 has a depending mounting bracket or strap 171 thereon formed to provide an annular ring 172 at its lower end. Ring 172 has a plurality of screw-threaded openings therein for the reception of correspondingly threaded locking bolts 173.

The pipe 1 has mounted thereon a U-bolt 166 connected to a bracket 167 which has its inner surface curved to fit the pipe 1. The bracket 167 is provided with a screw-threaded opening in which is threaded one end of a short pipe or rod 168. The ring 172 is fitted over pipe 168 and clamped thereto by bolts 173.

In order to level the meter the bracket 167 is provided at opposite ends with adjusting screws 174 the lower ends of which engage the pipe 1.

It will be apparent that our orifice meter may be easily and accurately mounted in position. After the bracket 167 is secured to the pipe the ring 172 may simply be slipped over the pipe 168, the meter adjusted as to height, and the bolts 173 tightened. The instrument may then be leveled by the leveling screws 174.

It will of course be understood that the meter may be mounted on any support other than the pipe 1, the shape of bracket 167 being changed accordingly.

It is believed that the operation of the above described orifice meter will be clear from the above description thereof. When the meter has been installed as shown in Figure 2 the filling plug 89 may be removed and the proper amount of liquid such as mercury poured into the tube 65. When the valves 5 and 9 are open the low and high pressure are put upon the pressure chambers of the orifice meter. In order to set or zero the instrument the valves 18 and 22 are opened and 19 is closed whereby the high and low pressure pipes 3 and 4 are shunted around the instrument such that the instrument should read zero. If it is desired to read the pressure on either side of the orifice this may be done by operation of valve 19, as previously described, a pressure gauge being screwed into opening 27 of manifold 16.

Due to the linkage provided between the float arm 48 and the indicator pen shaft 112, said pen shaft moves equal distances for equal movements of the float arm in all positions thereof. This is due to the fact that the slot 97 in the link 98 allows the pin 92 of the float arm to move back and forth with regard to the pen shaft, thus shortening or lengthening the effective radius of the arm 98.

By loosening of set screws 105 the dial 101 may be rotated to move hub 102 about axis 108 to thereby change the effective length of link 93 in order to calibrate instrument accurately and also in order to increase or decrease the movement of the pen shaft for equal movements of the float arm. The take-up lever 123 automatically eliminates lost motion between a pin 92 and the lever 98 connected to the pen shaft.

Although the compensating linkage has been described in detail in relation to an orifice meter having a float, it will be clearly understood that our invention is not limited to orifice meters, since the same compensating movement may be used in any float gauge, or in fact in any mechanical movement wherein reciprocatory motion is to be converted into rotary motion with accuracy.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What we claim and desire to secure by United States Letters Patent is:—

1. In an orifice meter, a low pressure chamber, a U tube connected thereto, a float in said chamber, a rod secured to the lower portion of said float and extending downwardly into said tube, a valve loosely pivoted to said rod and within said tube, and a valve seat within said tube for receiving said valve whereby said valve will accurately engage said seat to prevent loss of liquid in said U tube when excessive pressure is applied to said chamber.

2. The invention as in claim 1 wherein said valve has a guide rod thereon extending downwardly into said tube, and a guide through which said rod passes for guiding said rod, valve, and float.

3. An orifice meter having a high pressure chamber, a low pressure chamber, a U tube connecting said chambers, in combination with a combined dampening device and drain valve comprising a casing fixedly secured to the bottom of said U tube, a channel in said casing in communication with said tube, a rotatably adjustable plug in said channel, there being a vent in said casing communicating with said channel in the vicinity of said plug for preventing accumulation of sediment about the plug, and a valve independent of said plug for closing said vent.

4. In sub-combination in a differential gauge, a main casting having high pressure and low pressure passages therein, a float chamber detachably secured thereto in communication with one of said passages, a pressure chamber detachably secured to the casting in communication with the other of said passages, a sleeve detachably secured to one of said chambers and having a valve stem guide therein, a valve seat member clamped between said sleeve and the chamber to which it is secured, a valve secured to the float and seated therein, and a U-tube for holding liquid welded to the high pressure chamber and to the sleeve.

5. In sub-combination in a differential pressure gauge, a pressure responsive unit containing a column of liquid, connections for transmitting high and low pressures to the respective ends of said column and including means forming a passageway between the low pressure connection and the respective end of said liquid column, a float having a float rod extending through the passageway, a pressure operated automatic valve assembly comprising a composition seat fitted at that end of the passageway adjacent the low pressure connection, and a sealing element on the float designed to seat thereagainst when the pressure differential reaches a given maximum.

6. The invention defined in claim 5 wherein said sealing element is convex.

7. In combination with a differential pressure responsive device, a unitary valve body portion, a pipe secured to said body portion intermediate its ends and adapted to be connected at one end with said device, a second pipe integrally connected to said body portion and connected at one end to said device, said valve body having a passage therethrough communicating between said pipes, a cross passage through said body communicating with said first passage, a valve for controlling said cross passage, and valves adjacent the ends of said first passage for controlling flow therethrough.

8. In a differential gauge, a main casting having high and low pressure passages therein, a float chamber detachably secured thereto in communication with one of said passages, a pressure chamber detachably secured to said casting in communication with the other of said passages, a sleeve detachably secured to one of said chambers and having a valve stem guide therein, a nonmetallic resilient valve seat member clamped between said sleeve and the chamber to which it is secured, a valve adapted to be seated therein, and a U-tube for holding liquid secured to the pressure chamber and to said sleeve.

9. In an orifice meter, a casing having a pressure chamber therein, an actuating mechanism in said casing, a hollow tubular housing secured to the casing with its inner end opening into said chamber, and providing bearings at its ends, a pen shaft projecting through said tubular housing and rotatably supported in said bearings, and means for introducing sealing lubricant in said housing surrounding said pen shaft whereby said lubricant serves to seal said housing against passage of fluid from said chamber.

10. In an orifice meter, a casing having a pressure chamber therein, an actuating mechanism in said casing, a hollow tubular housing secured to the casing and opening into said chamber, bearings adjacent the ends of the housing, a pen shaft extending through said housing and through said bearings, said pen shaft having a conical shoulder acting against one of said bearings, and means for introducing lubricant into said housing surrounding said shaft to seal said housing against passage of fluid therethrough.

11. In an orifice meter, a casing having a pressure chamber therein, an actuating mechanism in said casing, a hollow tubular housing secured to the casing with its inner end opening into said chamber and providing a bearing at its inner end, the outer end of said housing having an inwardly extending annular flange, a pen shaft projecting through said tubular housing and through said bearing into said chamber, said pen shaft having a conical shoulder adjacent its outer end terminating in a reduced portion which projects through said flange, and means for introducing sealing lubricant in said housing surrounding said pen shaft whereby said lubricant serves to seal said housing against passage of fluid from said chamber.

12. In an orifice meter, a casing having a pressure chamber therein, an actuating mechanism in said casing, a hollow tubular housing secured to the casing with its inner end opening into said chamber, a cap for closing the inner end of said housing and providing a bearing therein, the other end of said housing having an inwardly extending annular flange, a pen shaft projecting through said tubular housing and bearing into said chamber and having a conical shoulder adjacent its outer end terminating in a reduced portion which projects through said flange, and means for introducing sealing lubricant into said housing surrounding said pen shaft whereby said lubricant serves to seal said housing against passage of fluid from said chamber.

13. In an orifice meter, a casing having a pressure chamber therein, an actuating mechanism in said casing, a hollow tubular housing secured to said casing with its inner end opening into said chamber, a shaft bearing at one end of said housing, a threaded member providing a bearing threadedly secured in and sealed against the other end of said housing, a pen shaft projecting through said tubular housing and rotatably supported in said bearings, and means for introducing sealing lubricant in said housing surrounding said pen shaft, whereby said lubricant serves to seal said housing against passage of fluid from said chamber.

14. In an orifice meter, a casing having a pressure chamber therein, an actuating mechanism in said casing, a hollow tubular housing secured to the casing with its inner end opening into said chamber and providing a bearing at its inner end, the outer end of said housing having an inwardly extending annular flange, a pen shaft projecting through said tubular housing and through said bearing into said chamber, said pen shaft having a conical shoulder adjacent its outer end terminating in a reduced portion which projects through said flange, a spring acting on said pen shaft to hold said conical shoulder against said flange and means for introducing a sealing lubricant in said housing surrounding said pen shaft, whereby said lubricant serves to seal said housing against passage of fluid from said chamber.

15. In a differential gauge, a main casting having high pressure and low pressure passages therein, a float chamber detachably secured thereto in communication with one of said passages, a pen shaft, a float in said chamber for operating said pen shaft, a pressure chamber detachably secured to the casting in communication with the other of said passages, a U-tube for holding liquid, secured to said pressure chamber, means detachably securing said U-tube to said pressure chamber, a valve seat member clamped between said U-tube and the float chamber, and a valve articulately connected to said float and depending therefrom and adapted to be seated on said valve seat member when the float reaches its lower position.

16. In combination with a differential pressure responsive device, a unitary valve body portion, a pipe integrally secured to said body portion between its ends and adapted to be connected at one end to said device, a second pipe integrally connected to said body portion and adapted to be connected at one end with said device, said valve body having a passage therethrough and in communication with said pipes, valves in said passageway adjacent each end thereof controlling communication of said passageway with said pipes, an opening in said body between said valves, and a valve for placing said passageway in communication with said opening.

17. The combination with a differential pressure responsive device of a unitary manifold structure comprising a unitary valve body having a passage therethrough, a low pressure pipe integrally secured to said valve body between its ends and communicating with said passageway, a high pressure pipe integrally secured to said valve body at one end for communication with said passage, said low pressure pipe extending from said manifold for connection with said pressure responsive device and in the opposite direction for connection with a source of pressure, said high pressure pipe including a branch for connection to said pressure responsive device, the integral connections of said pipes to said valve body serving to approximately locate said pipes in position for making said connections, and valves in said body adjacent each end thereof for controlling communication of said passage with said pipes, an opening in said body between said valves, and a valve for placing said passageway in communication with said opening.

WALTER H. PARKER.
NELSON J. SEIBERT.
ALLEN D. MacLEAN.